United States Patent [19]

Kolb

[11] Patent Number: 5,033,945
[45] Date of Patent: Jul. 23, 1991

[54] ECCENTRIC SHAFT WITH COUNTERWEIGHT

[75] Inventor: Roland Kolb, Dielsdorf, Switzerland

[73] Assignee: Asea Brown Boveri Ltd., Baden, Switzerland

[21] Appl. No.: 436,005

[22] Filed: Nov. 13, 1989

[30] Foreign Application Priority Data

Nov. 30, 1988 [CH] Switzerland .......................... 4440/88

[51] Int. Cl.$^5$ .......................... F04C 18/04; F16B 7/00; F16D 1/06
[52] U.S. Cl. .................. 418/55.1; 418/55.3; 418/151; 74/570; 74/589; 74/603; 403/383
[58] Field of Search .................. 418/55 R, 55 B, 151, 418/55.1, 55.3; 74/570, 589, 590, 603; 403/350, 383

[56] References Cited

U.S. PATENT DOCUMENTS 2,325,804  8/1943  Shoemaker .......................... 74/595
4,294,562 10/1981  Mullenberg .......................... 403/383

FOREIGN PATENT DOCUMENTS 0052461  5/1982  European Pat. Off. .
2603462  3/1982  Fed. Rep. of Germany .
3313000 10/1984  Fed. Rep. of Germany .
3802923  8/1988  Fed. Rep. of Germany ...... 418/151
1533301  6/1968  France .
 102461  9/1941  Sweden .......................... 403/350
 402695 10/1973  U.S.S.R. .......................... 403/383
 945555  1/1964  United Kingdom .

Primary Examiner—John J. Vrablik
Attorney, Agent, or Firm—Oblon, Spivak, McClelland, Maier & Neustadt

[57] ABSTRACT

On an eccentric shaft having at least one counterweight (20) which is mounted to the shaft as separate part, the seat of the counterweight on the shaft exhibits a cross-section bounded by two circular arcs. One circular arc (43) which is diametrically opposite to the eccentric (23) has its center on the eccentric axis (41) and the other circular arc (44) has its center on the axis of rotation (42) of the shaft (24). Use of the drive shaft in a displacement machine of the spiral type of construction, in which a displacement body is held on a disk-shaped rotor which can be eccentrically driven with respect to a housing.

3 Claims, 2 Drawing Sheets

ECCENTRIC SHAFT WITH COUNTERWEIGHT

BACKGROUND OF THE INVENTION

1. Field of the Invention

The invention relates to an eccentric shaft having at least one counterweight which is arranged to be keyed to the shaft as a separate part.

It also relates to the use of such an eccentric shaft as the drive shaft of a displacement machine of the spiral type of construction.

2. Discussion of Background

Displacement machines of the spiral type of construction having such an eccentric shaft are known, for example, from DE-A-3 313 000. A compressor constructed in accordance with this principle is characterized by an almost pulsation-free delivery of the gaseous working medium consisting, for example, of air or of an air/fuel mixture and could therefore also be advantageously used for, among other things, purposes of charging internal combustion engines. During the operation of such a compressor, several approximately sickle-shaped working spaces are enclosed along the displacement chamber between the spiral displacement body and the two circumferential walls of the displacement chamber, which spaces move from the inlet through the displacement chamber towards the outlet with continuous reduction in their volume and corresponding increase in the pressure of the working medium.

In this known machine, two eccentric arrangements arranged at a distance from one another are provided, one of which can be driven via a drive shaft. This results in a statically determined bearing arrangement which, in addition, ensures positive guidance of the rotor apart from the top and bottom dead centers of the rotor position. To achieve unambiguous guidance of the rotor also at the dead center positions of the rotor, a guide shaft, supported in the housing, of the second eccentric arrangement is force-locked to the drive shaft via a transmission, the transmission being formed, for example, by a toothed belt drive.

The main shaft driving the rotor is centrally arranged and carries two counterweights which are fitted onto the shaft symmetrically with respect to the center of the eccentric bearing. The angular position of such counterweights is usually achieved by means of a key. In this connection, the determination of the key seating position with respect to the position of the eccentric represents a not inconsiderable problem in manufacture. This is because the prerequisite for a running of the charger without imbalance is a very accurate angular position of the key seating.

SUMMARY OF THE INVENTION

On the basis of the finding that an unambiguous angular position is best achieved by manufacturing the seat for the counterweight with the same setting as the machining for the shaft and eccentric, accordingly one object of this invention is to simplify the geometry of the mounting arrangement of the counterweight with respect to cost optimization.

The object is achieved by the fact that the seat of the counterweight on the shaft exhibits a cross-section bounded by two circular arcs, one circular arc which is diametrically opposite to the eccentric having its center on the eccentric axis and the other circular arc having its center on the axis of rotation of the shaft.

The advantage of the invention can be seen particularly in the achievable accuracy of the angular position which corresponds to the machining accuracy of the machine tool both in the case of a cutting turning process or a grinding process. In this connection, this advantage is achieved without additional expenditure since the surface having the respective circular arc is treated in the same work cycle as the corresponding counterpart, that is to say shaft or eccentric, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

In the various figures, like reference numerals designate identical parts throughout the several views.

DESCRIPTION OF THE PREFERRED EMBODIMENTS

Figure 1:
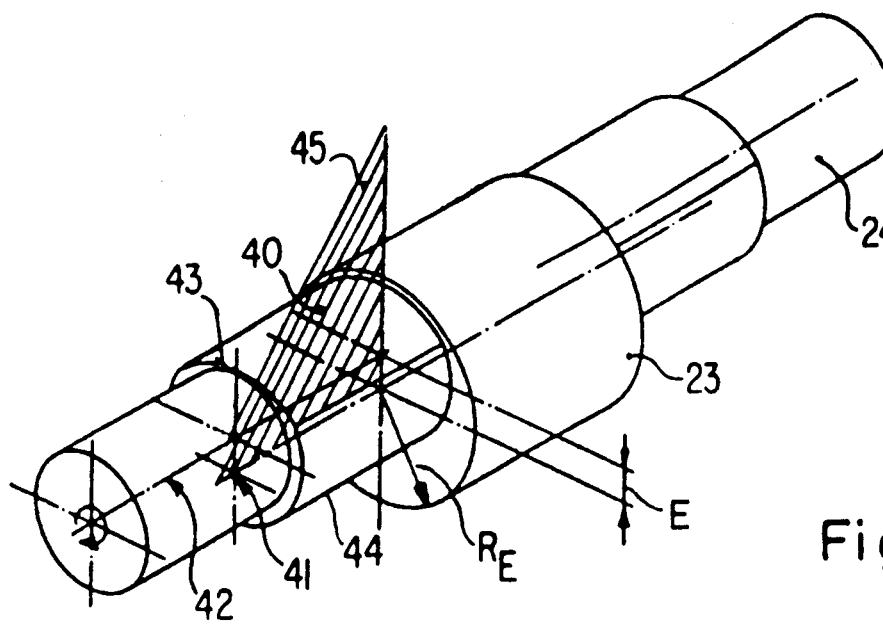
FIG. 1 shows a perspective view of a bare eccentric shaft.

Referring now to the drawings, in FIG. 1, 24 designates a shaft which is provided with an eccentric disk 23. The seating faces 40 for the counterweights, not shown, are applied on both sides of this eccentric, having the radius $R_E$, the axis 41 of which is offset with respect to the axis of rotation 42 of the shaft by the eccentricity E. These seating faces are circular arc surfaces 43, 44, which are machined with the same setting as their respective counterparts, that is to say the circular arc surface 43 is produced together with the eccentric disk 23 and the circular arc surface 44 is produced together with the shaft (shaft portion) 24.

Figure 2:
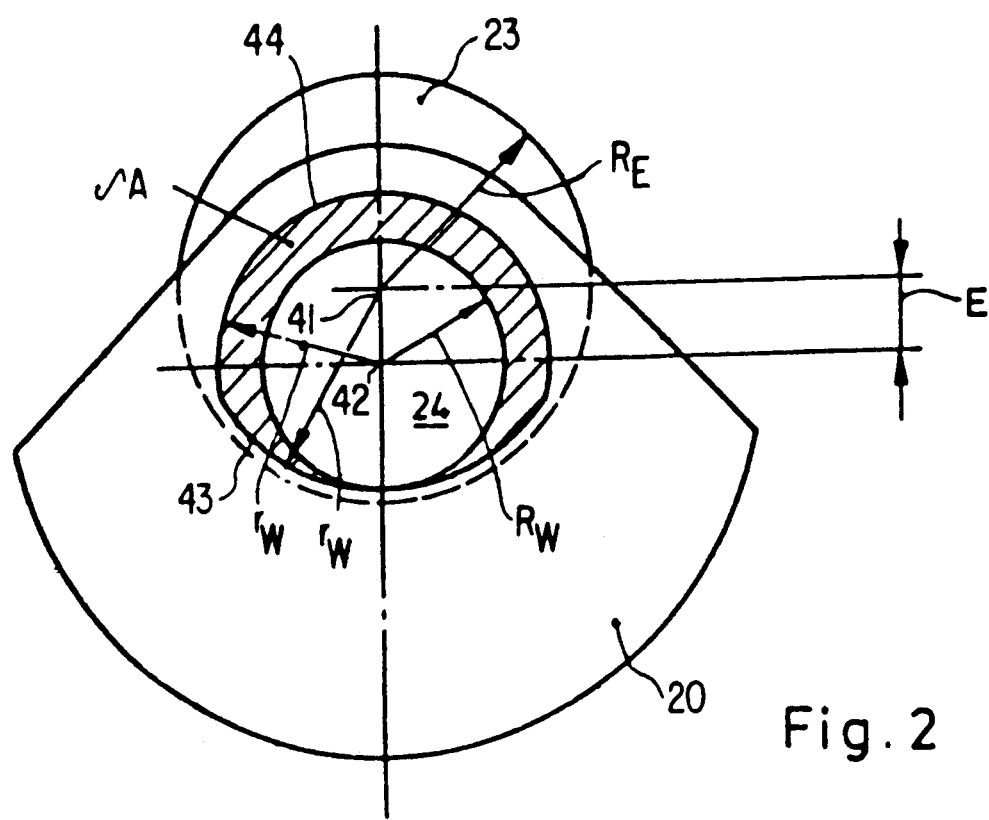
FIG. 2 shows a front view of an eccentric shaft equipped with counterweight.

For this purpose, it is necessary—as is shown most clearly in the embodiment of FIG. 2—that the circular arc 43 diametrically opposite to the eccentric 23 has its center on the eccentric axis 41 and that the circular arc 44 has its center on the axis of rotation 42 of the shaft 24. The cross-section of the seat, bounded by the two circular arcs 43 and 44, accordingly has an asymmetrical oval shape which of necessity is dimensioned greater than the circular cross-section of the shaft by the shaded area $\delta A$. This leads to increased stability of the shaft against flexing which is of advantage, in addition to the fact that, due to the omission of key seatings, there are also no negative notching effects. The size of this area $\delta A$ is naturally dependent on the radii of the circular arcs.

In deviation from the variant shown in FIG. 1 in which the circular arc 43 is slightly raised compared with the shaft 24, the variant of FIG. 2 provides that the circular arc 43 which is diametrically opposite to the eccentric 23 has a radius $r_E$ which is composed of the radius $R_W$ of the shaft and the eccentricity E of the eccentric. The circular arc surface 43 is therefore flush with the shaft surface at the radially lowest point. The choice of the radius $r_W$, which must in every case be greater than the shaft radius $R_W$, now provides a means for determining the size of the area $\delta A$.

The counterweight or counterweights 20 which are provided with a correspondingly oval-shaped opening can now be simply pressed onto the seat 40. These balancing masses can be, for example, sintered parts or stamped parts of small thickness, several of which, placed next to one another, form the counterweight. In this case, the parts closest to the eccentric can be provided with a simple sliding seat and only the part facing away from the eccentric must be pressed onto the shaft.

Figure 3:
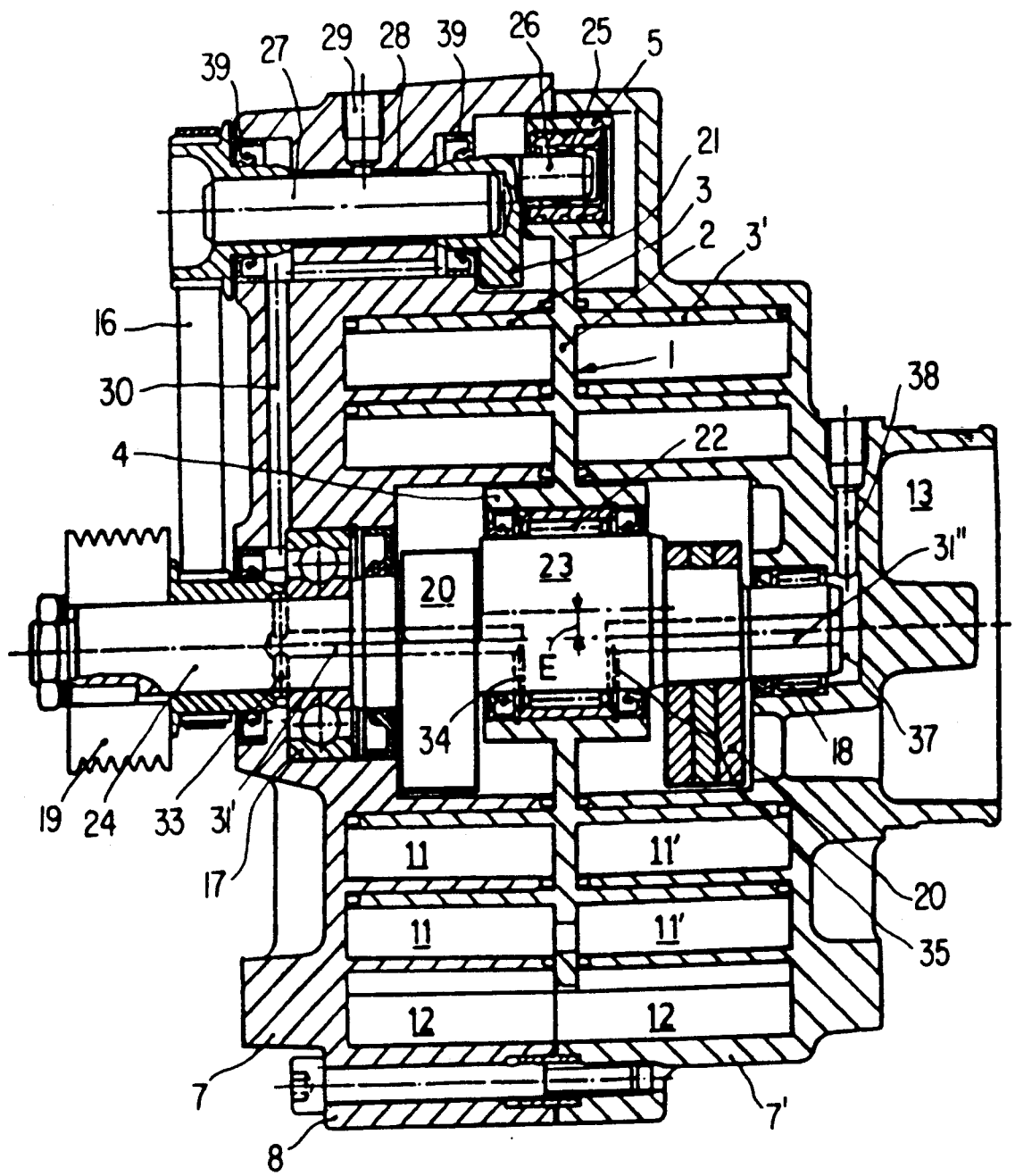
FIG. 3 shows a longitudinal section through a displacement machine with eccentric shaft installed.

An illustrative embodiment is described with reference to the displacement machine shown in FIG. 3: To explain the operation of this compressor, which is not the subject-matter of the invention, reference is made, for example, to DE-C3-2 603 462. In the text which follows, only the machine construction and process sequence necessary for understanding the invention is described briefly.

The rotor of the machine is designated by 1 overall. On both sides of the disk 2, in each case two spirally extending displacement bodies are arranged which are offset by 180° with respect to one another. These are strips 3,3', which are held vertically on the disk 2. The spirals themselves are formed, as a rule, from several mutually adjoining circular arcs. The hub by means of which the disk 2 is mounted on a roller bearing 22 is designated by 4. The bearing itself is seated on an eccentric disk 3 which, in turn, is a part of the drive shaft 24. An eye arranged radially outside the strips 3,3' for accommodating a guide bearing 25, which is mounted on a eccentric bolt 26, is designated by 5. This guide bearing, in turn, is a part of a guide shaft 27.

The machine housing consists of two assembled halves 7, 7', which are joined to one another via mounting eyes 8 for receiving screw fittings. The delivery spaces which are in each case offset by 180° with respect to one another and which are machined into the two housing halves in the manner of a spiral slot are designated by 11 and 11'. They extend from one inlet 12,12' each, which is arranged at the outer circumference of the spiral in the housing, to a common outlet 13 which is provided in the interior of the housing and is common to the two delivery spaces. They exhibit essentially parallel cylinder walls which are arranged at a constant distance from one another and which encompass a spiral of approximately 360° or more like the displacement bodies of the disk 2. Between these cylinder walls, the displacement bodies 3,3' are engaged, the curvature of which is dimensioned in such a manner that the strips almost contact the inner and outer cylinder walls of the housing at several locations, for example at two locations in each case.

The two spaced-apart eccentric arrangements 23, 24 and 26, 27 respectively, handle the drive and the guidance of the rotor 1. The drive shaft 24 is supported in the roller bearings 17 and 18 and is provided at its end protruding from the housing half 7 with a V-belt pulley 19 for the drive. On the drive shaft 24, the counterweights 20 are arranged for balancing the inertial forces produced with the eccentric drive of the rotor. Such a balancing mass 21 is also mounted on the guide shaft 27. Inside the housing half 7 this guide shaft is inserted in a sliding bearing 28 which is sealed on both sides with ring seals 39.

To achieve an unambiguous guidance of the rotor at the dead center positions, the two eccentric arrangements are angularly accurately synchronized via a toothed belt drive 16. This double eccentric drive ensures that all points of the rotor disk, and thus all points of the two strips 3 and 3' perform a circular displacement movement. Due to the alternating multiple approaches of the strips 3,3' to the inner and outer cylinder walls of the associated delivery chambers, sickle-shaped working spaces enclosing the working medium are obtained on both sides of the strips, which working spaces are displaced through the delivery chambers in the direction of the outlet whilst the rotor disk is being driven. During this process, the volumes of these working spaces are reduced and the pressure of the working medium is correspondingly increased.

A common system is provided for lubricating the bearings accommodated in the housing 7, 7' and the main eccentric bearing 22. Lubricant, preferably oil, is conducted from a lubricant source, not shown, via a hole 29 in the housing half 7 to the sliding bearing 28. The oil is collected on both sides of this bearing and conducted via a hole 30 into the area of the drive shaft 24 where some of the oil is used for lubricating the roller bearing 17. The main eccentric bearing 22 and the roller bearing 18 are lubricated and the lubricant is conducted out of the housing half 7' via the path 33, 31', 34, 35, 31", 37, 38.

The counterweights 20 arranged on both sides of the eccentric disk 23 on the shaft 24 consist of in each case three stamped parts which are pressed onto the shaft.

According to the representation in FIG. 1, the centers of the radii of the two circular arcs form with the axis of rotation 42 and the eccentric axis 41 a geometrical longitudinal plane 45 (shaded) within which the centers of gravity of the counterweights 20 and of the eccentric disk 23 and of the displacer (1 to 4 in FIG. 3) are located.

Naturally, the invention is not restricted to the examples shown and described. Thus, for example, the guide shaft 27 in FIG. 3 and its balancing mass 21 could also be equipped with the new measure.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An eccentric shaft comprising:
    a shaft portion having an axis of rotation;
    an eccentric portion having a center on an eccentric axis offset from the axis of rotation;
    a counterweight seat having a cross-section bounded by two circular arcs, one of said circular arcs being diametrically opposed to said eccentric and having a center on said eccentric axis, the other of said circular arcs having a center on said axis of rotation; and
    a counterweight mounted to said counterweight seat.

2. Eccentric shaft as claimed in claim 1, wherein the circular arc which is opposite to the eccentric has a radius which is composed of the radius of the shaft portion and the eccentricity of the eccentric.

3. The eccentric shaft of claims 2 or 1 in a displacement machine for compressible media, comprising:
    a stationary housing having at least one spirally extending slot; and
    a displacement body comprising a disc shaped rotor having at least one spirally extending strip cooperating with said stationary housing to comprise at least one delivery space,
    wherein said eccentric shaft comprises means for eccentrically driving said rotor.

* * * * *